US011189888B2

(12) United States Patent
Liu et al.

(10) Patent No.: US 11,189,888 B2
(45) Date of Patent: Nov. 30, 2021

(54) MOBILE POWER PACK COMBINATION (71) Applicant: Cheng Uei Precision Industry Co., Ltd., New Taipei (TW)

(72) Inventors: Yu-Feng Liu, Dong-Guan (CN); Yuan-Yu Hwang, New Taipei (TW); Xiao-Kang Yang, Dong-Guan (CN); Ren-Chun Zhong, Dong-Guan (CN); Shao-Chun Li, Dong-Guan (CN)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 90 days.

(21) Appl. No.: 16/711,422

(22) Filed: Dec. 11, 2019

(65) Prior Publication Data
US 2020/0388812 A1 Dec. 10, 2020

(30) Foreign Application Priority Data
Jun. 4, 2019 (CN) .......................... 201920836968.6

(51) Int. Cl.
*H01M 2/24* (2006.01)
*H01M 50/502* (2021.01)
*H01M 10/44* (2006.01)
*H01M 50/20* (2021.01)

(52) U.S. Cl.
CPC ....... *H01M 50/502* (2021.01); *H01M 10/441* (2013.01); *H01M 50/20* (2021.01); *H01M 2220/30* (2013.01)

(58) Field of Classification Search
CPC ............ H01M 50/502; H01M 50/503; H01M 50/505; H01M 50/507; H01M 50/509; H01M 50/20; H01M 50/202; H01M 10/441; H01M 10/44; H01M 10/46; H01M 2220/30
See application file for complete search history.

(56) References Cited

U.S. PATENT DOCUMENTS

2018/0006281 A1* 1/2018 Eom ................... H01M 10/482
2020/0164760 A1* 5/2020 Sohmshetty ............ B60L 53/36

* cited by examiner

*Primary Examiner* — Raymond Alejandro
(74) *Attorney, Agent, or Firm* — Cheng-Ju Chiang (57) ABSTRACT

A mobile power pack combination of the present invention includes a first mobile power pack and at least a second mobile power pack. The first mobile power pack has a first housing. The first housing is disposed with a first charging unit and a first probe-type connector connected to the first charging unit. The second mobile power pack has a second housing. The second housing is disposed with a second charging unit, a first probe-type connector and a second probe-type connector connected to the second charging unit. When the second mobile power pack is stacked on the first mobile power pack, the second probe-type connector of the second mobile power pack is connected with the first probe-type connector of the first mobile power pack to make electric current conduct. Therefore, the mobile power pack combination provides charging function based on stackable technology and is convenient to carry.

5 Claims, 12 Drawing Sheets

MOBILE POWER PACK COMBINATION

BACKGROUND OF THE INVENTION

1. Field of the Invention

The present application is based on, and claims priority from, China application number 201920836968.6, filed Jun. 4, 2019, the disclosure of which is hereby incorporated by reference herein in its entirety. The present invention generally relates to a mobile power pack combination, and more particularly to a mobile power pack combination providing charging function based on stackable technology and being convenient to carry.

2. Related Art

Mobile power pack is a device which conserves battery power and plays as a portable power charger of laptop, cell phone, etc. and is already widely used in digital products.

However, capacitance of most mobile power packs is limited. Mobile power pack with large capacitance has heavy weight which results in poor portability. Although the mobile power pack with small capacitance has less weight, it is unlikely to provide sufficient electricity for charging in practice.

Therefore, there is a need to provide a mobile power pack combination providing charging function based on stackable technology and being convenient to carry.

SUMMARY OF THE INVENTION

An object of the present invention is to provide a mobile power pack combination to overcome the flaws and insufficiency of the state of the art.

To attain this, a mobile power pack combination of the present invention includes a first mobile power pack and at least a second mobile power pack. The first mobile power pack has a first housing. The first housing is disposed with a first charging unit and a first probe-type connector. The first probe-type connector is connected to the first charging unit. The first charging unit consists of a first circuit board and a first coil. The second mobile power pack is connected to and stacked on the first mobile power pack. The second mobile power pack has a second housing. The second housing is disposed with a second charging unit, a first probe-type connector and a second probe-type connector. The first probe-type connector and the second probe-type connector are connected to the second charging unit. The second charging unit consists of a second circuit board, a second coil and a rechargeable battery. When the second mobile power pack is stacked on the first mobile power pack, the second probe-type connector of the second mobile power pack is connected with the first probe-type connector of the first mobile power pack to make electric current conduct.

Accordingly, each of the first probe-type connector and the second probe-type connector is disposed with several single probes and a base body. Each of the single probes includes an outer tube, a probe pin and a probe tube. A part of the outer tube is encased in the base body. The outer tube is extended upward to form the probe pin. The outer tube is extended downward to form the probe tube which is exposed out of the base body.

Accordingly, a front end of the probe pin of the first probe-type connector is in semicircle shape.

Accordingly, a front end of the probe pin of the second probe-type connector has a concave surface.

Accordingly, the first housing consists of a first lower cover and a first upper cover, the second housing consists of a second lower cover and a second upper cover.

Accordingly, each of left and right sides of the first probe-type connector and the second probe-type connector is provided with a magnet.

As above, the mobile power pack combination of the present invention provides an optimized structure, by which the probe pin of the first probe-type connector is connected to the probe pin of the second probe-type connector to make electric current conduct, and the first mobile power pack and the second mobile power pack can be used independently. Therefore, the mobile power pack combination provides charging function based on stackable technology and is convenient to carry.

DESCRIPTION OF THE PREFERRED EMBODIMENTS

In order to describe the technical contents, structural features, purpose to be achieved and the effectiveness of a mobile power pack combination 100 of the present invention, the detailed description is given with schema below.

Figure 1:
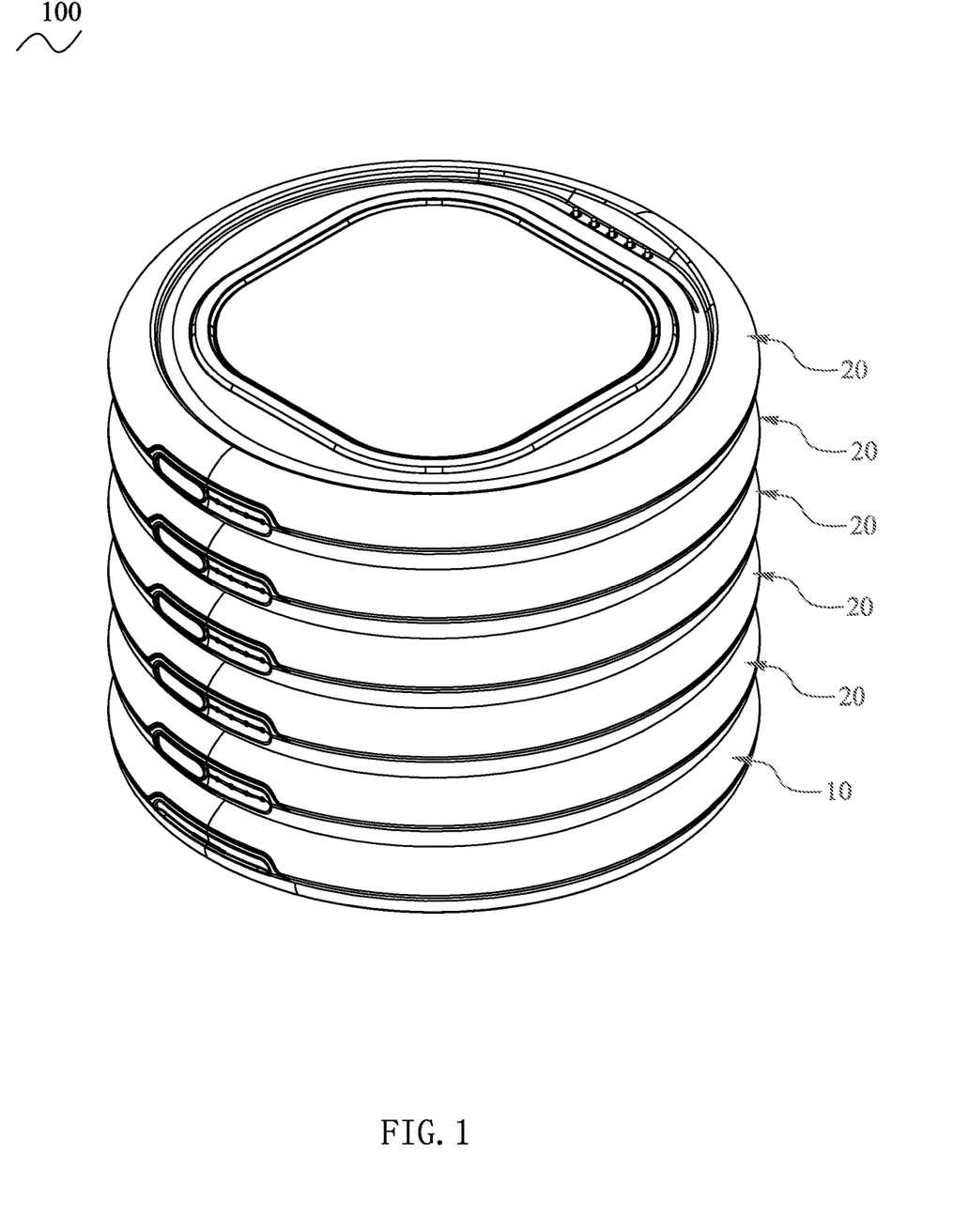
FIG. 1 is a perspective view showing a mobile power pack combination in accordance with the present invention.
Figure 2:
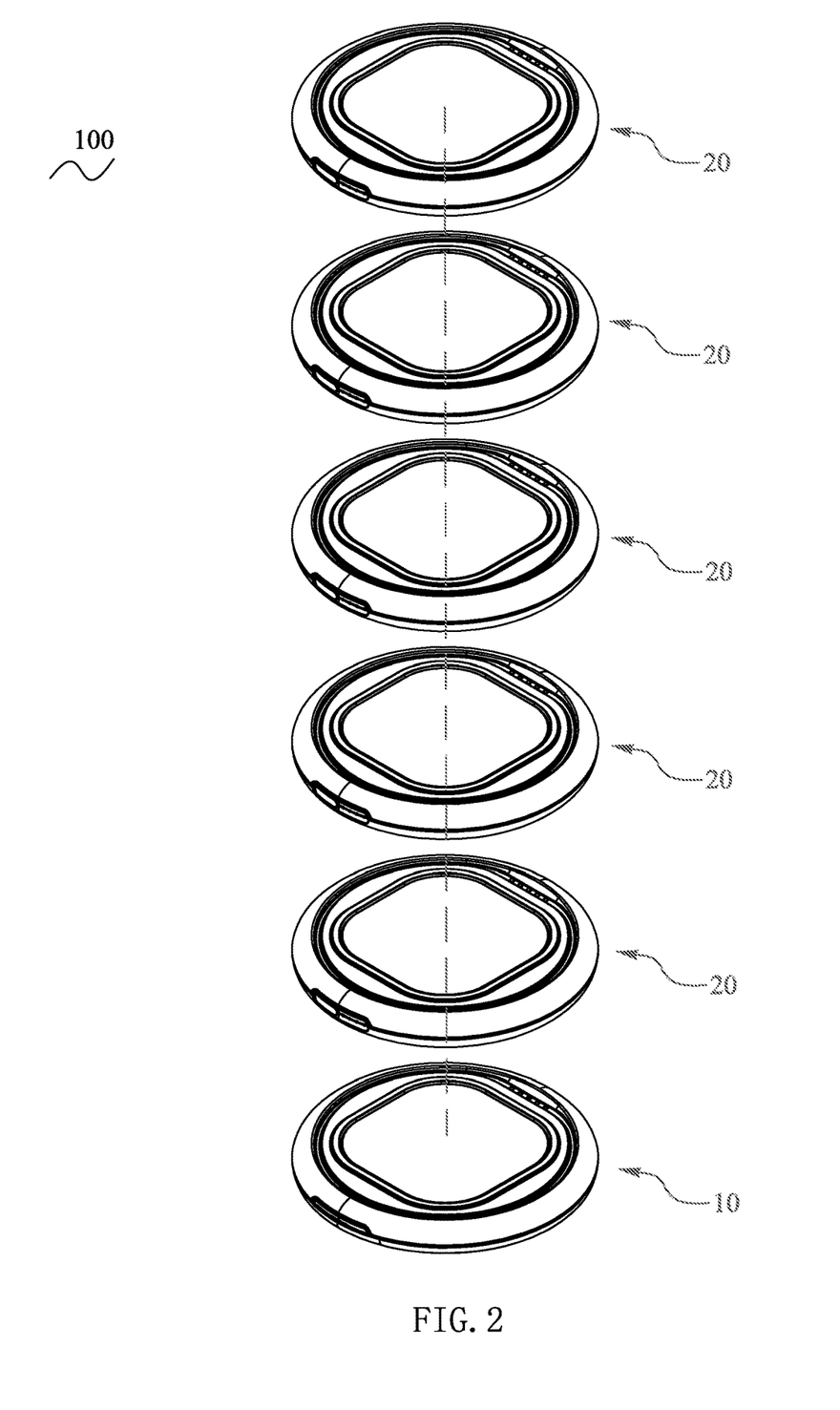
FIG. 2 is an exploded perspective view of FIG. 1.

Referring to FIG. 1 and FIG. 2, the mobile power pack combination 100 of the present invention includes a first mobile power pack 10 and at least a second mobile power pack 20. The first mobile power pack 10 is connected in series to the second mobile power pack 20. An amount of the second mobile power pack 20 is not limited, which can be increased or decreased according to the needs of a user.

Figure 3:
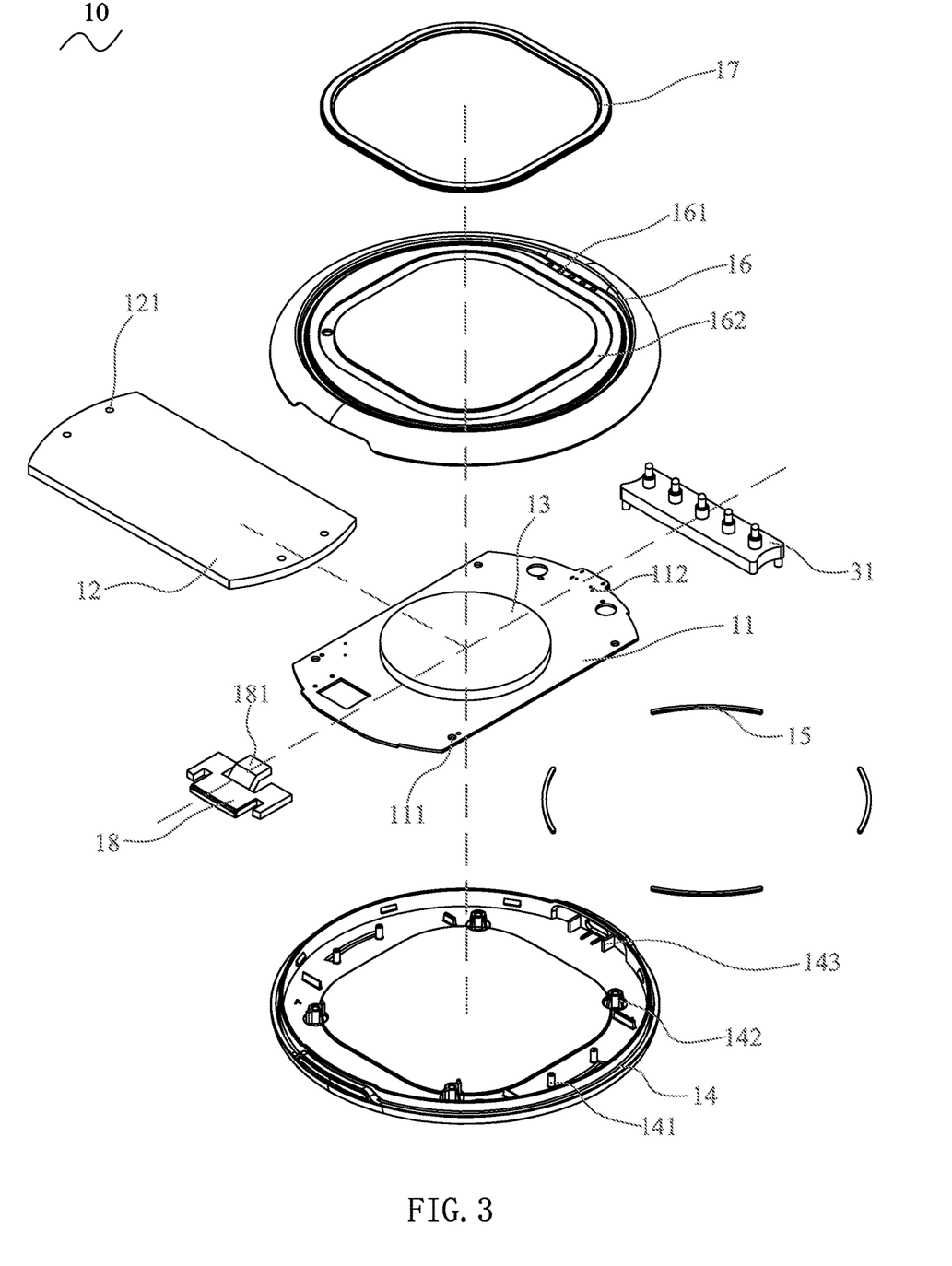
FIG. 3 is an exploded perspective view showing a first mobile power pack of the mobile power pack combination of the present invention.
Figure 4:
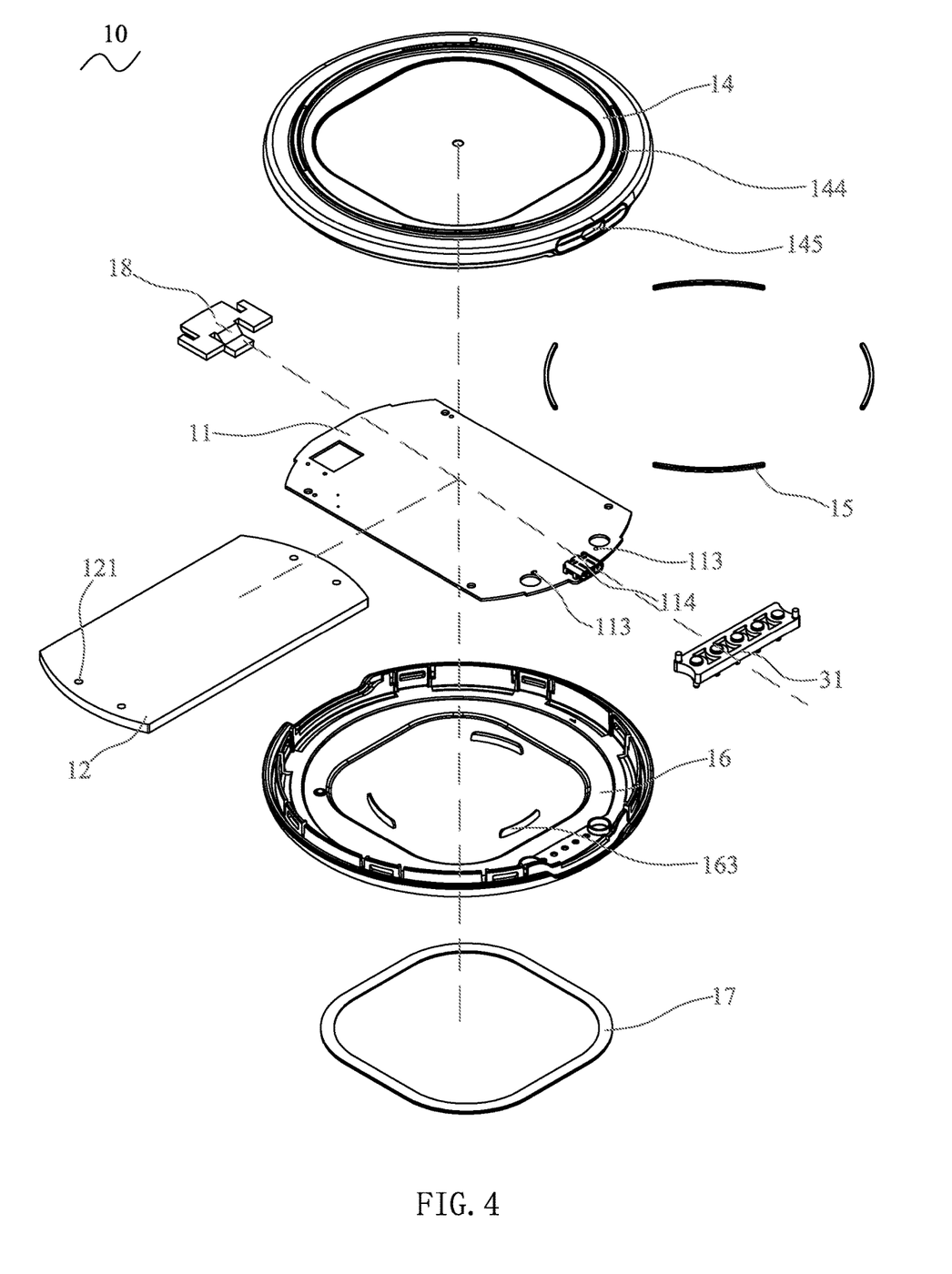
FIG. 4 is an exploded perspective view showing the first mobile power pack of FIG. 3 from another angle.

With reference to FIG. 3 and FIG. 4, the first mobile power pack 10 includes a first circuit board 11, a weight balancing block 12, a first coil 13, a first housing (not shown), a plurality of first footpads 15, a first anti-slip mat 17, a light pipe 18 and a first probe-type connector 31. The weight balancing block 12 is arranged on a bottom surface of the first circuit board 11 for counterweight. The first coil 13 is connected to a top surface of the first circuit board 11 for emission of energy. The first circuit board 11 and the first coil 13 form a first charging unit (not shown). The first coil 13, the first circuit board 11 and the weight balancing block 12 are placed in the first housing in order from top to bottom. In this embodiment, the first housing consists of a first lower cover 14 and a first upper cover 16, so the first coil 13, the first circuit board 11 and the weight balancing block 12 are placed between the first lower cover 14 and the first upper cover 16 in order from top to bottom. The plurality of the first footpads 15 are arranged on a bottom surface of the first lower cover 14. The first anti-slip mat 17 is arranged on a top surface of the first upper cover 16 to avoid slipping in use of the first mobile power pack 10. The light pipe 18 is welded on a front end of a bottom surface of the first circuit board 11 for showing a battery level of the first mobile power pack 10. The first probe-type connector 31 is connected to a rear end of a top surface of the first circuit board 11. In this embodiment, the first mobile power pack 10 is charged by a cable of USB type-C and is charged and discharged by wireless emission of energy.

The first circuit board 11 is disposed with several positioning holes 111, several cavities 112, a pair of location holes 113 and a socket connector 114. The weight balancing block 12 is disposed with several through holes 121. The first lower cover 14 is disposed with several fixed pillars 141, several positioning pillars 142, several convex pieces 143, several positioning grooves 144 and a charge hole 145. The first upper cover 16 is disposed with several openings 161, a circular groove 162 and several positioning pieces 163. The light pipe 18 is disposed with a flat top 181. A bottom surface of each of the positioning holes 111 is positioned with a top surface of each of the positioning pillars 142 to fix the first circuit board 11. The pair of the location holes 113 are used to fix the first probe-type connector 31. The socket connector 114 is positioned in the cavities 112 and arranged between the convex pieces 143 and engaged in the charge hole 145 so that the socket connector 114 is fixed. In this embodiment, the socket connector 114 is a connector of USB type-C into which an external cable of USB type-C is plugged for a connection to an external power supply. The through holes 121 receive the fixed pillars 141 to realize positioning and fixation between the weight balancing block 12 and the first lower cover 14. The positioning grooves 144 are used to fix the plurality of the first footpads 15. The openings 161 are used to position the first probe-type connector 31. A part of the first probe-type connector 31 is exposed to an outside of the first upper cover 16. The circular groove 162 is used to position the first anti-slip mat 17 that avoids slipping contacts in use. The positioning pieces 163 are abutted with the first lower cover 13 to realize positioning and fixation between the first upper cover 16 and the first lower cover 13. The flat top 181 is welded on a bottom surface of the first circuit board 11 to connect the light pipe 18 and the first circuit board 11.

Figure 5:
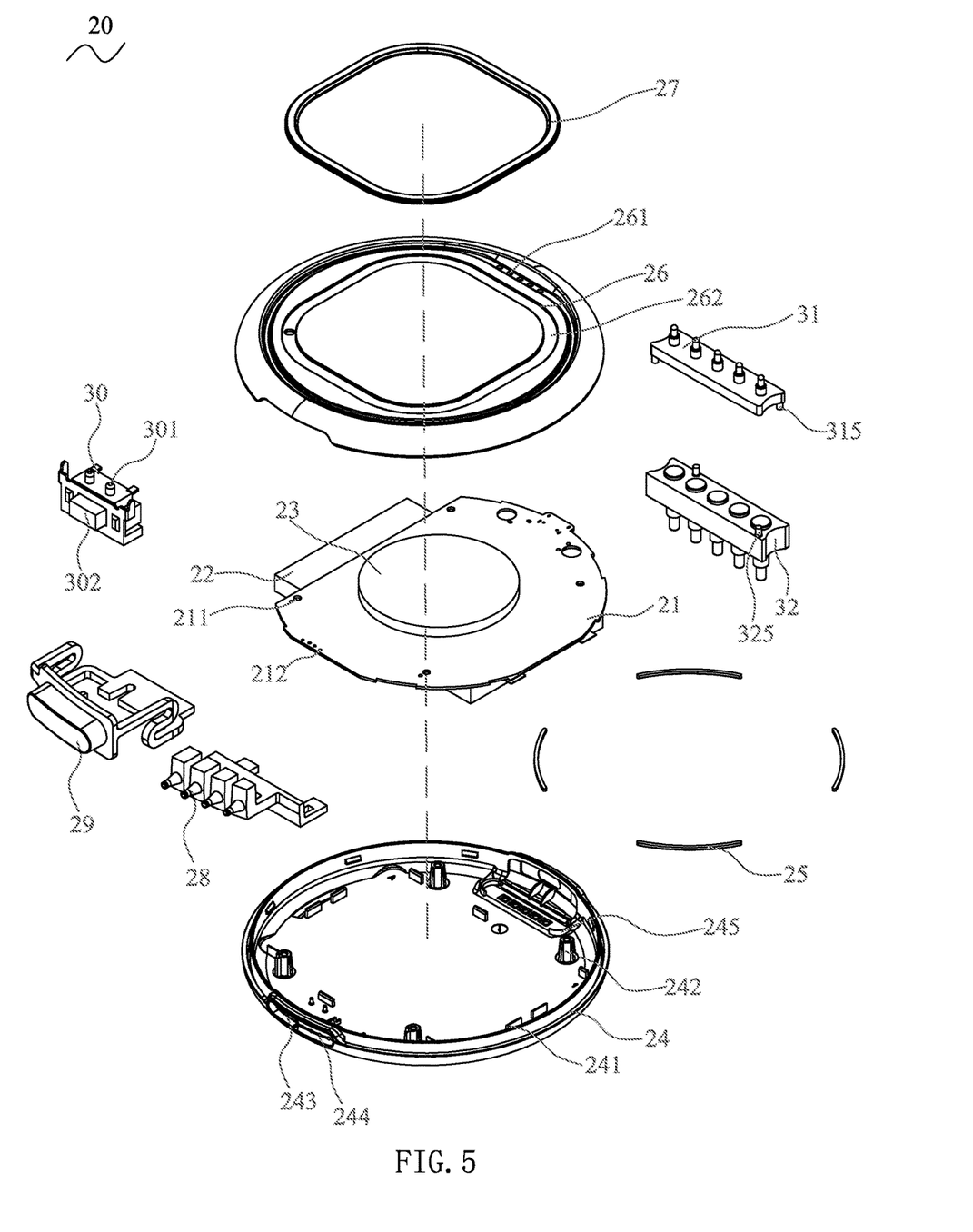
FIG. 5 is an exploded perspective view showing a second mobile power pack of the mobile power pack combination of the present invention.
Figure 6:
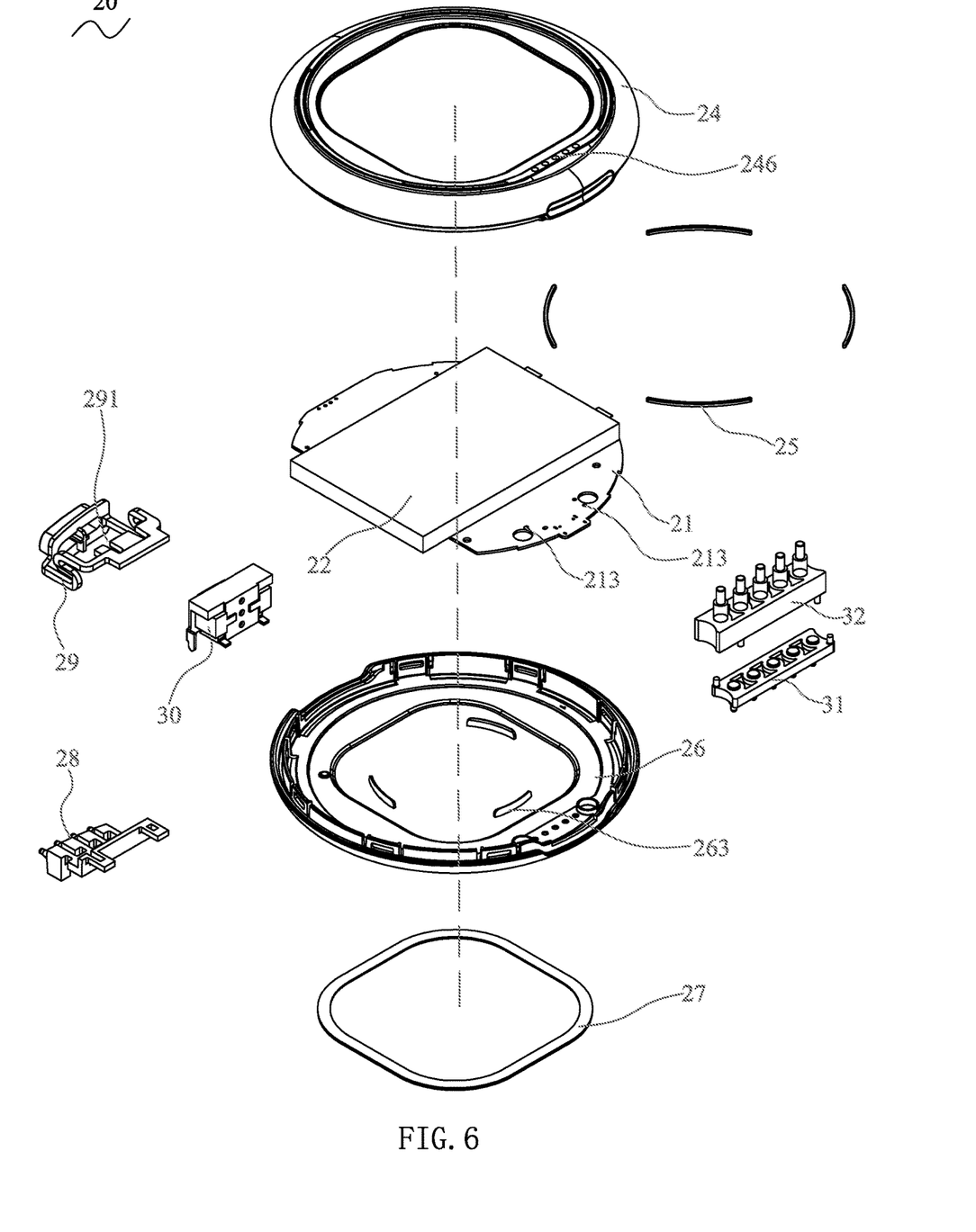
FIG. 6 is an exploded perspective view showing the second mobile power pack of FIG. 5 from another angle.

With reference to FIG. 5 and FIG. 6, the second mobile power pack 20 includes a second circuit board 21, a rechargeable battery 22, a second coil 23, a second housing (not shown), a plurality of second footpads 25, a second anti-slip mat 27, an indicator lamp 28, a power button 29, a switch 30, a first probe-type connector 31 and a second probe-type connector 32. The rechargeable battery 22 is connected to a bottom surface of the second circuit board 21 for storing electrical energy. The second coil 23 is connected to a top surface of the second circuit board 21 for receiving energy. The second circuit board 21, the rechargeable battery 22 and the second coil 23 form a second charging unit (not shown). The second coil 23, the second circuit board 21 and the rechargeable battery 22 are placed in the second housing in order from top to bottom. In this embodiment, the second housing consists of a second lower cover 24 and a second upper cover 26, so the second coil 23, the second circuit board 21 and the rechargeable battery 22 are placed between the second lower cover 24 and the second upper cover 26 in order from top to bottom. The plurality of the second footpads 25 are arranged on a bottom surface of the second lower cover 24. The second anti-slip mat 27 is arranged on a top surface of the second upper cover 26 to avoid slipping in use of the second mobile power pack 20.

The indicator lamp 28 is connected to a front end of the second circuit board 21 for showing a battery level of the second mobile power pack 20. A left side of the indicator lamp 28 is connected to the power button 29. A middle of the power button 29 is connected to the switch 30 and the switch 30 is fixed on a corresponding component of a front end of the second circuit board 21, so the indicator lamp 28 starts flashing as soon as the power button 29 is pressed. The first probe-type connector 31 is connected to a rear end of a top surface of the second circuit board 21. The second probe-type connector 32 is connected to a rear end of a bottom surface of the second circuit board 21. The first probe-type connector 31 and the second probe-type connector 32 are disposed relative to each other. In this embodiment, the second mobile power pack 20 is charged by a connection of the first probe-type connector 31 and the second probe-type connector 32 and is charged and discharged by emission of energy. In practice, the second mobile power pack 20 is charged by a cable of USB type-C and is charged and discharged by emission of energy.

The second circuit board 21 is disposed with several positioning holes 211, several cavities 212 and a pair of location holes 213. The second lower cover 24 is disposed with several stop blocks 241, several positioning pillars 242, a notch 243, a lamp base 244, several second positioning pieces 245 and several openings 246. The second upper cover 26 is disposed with several openings 261, a circular groove 262 and several positioning pieces 263. The power button 29 is disposed with a recess 291. The switch 30 is disposed with at least a fixed part 301 and a convex block 302. A bottom surface of each of the positioning holes 211 is abutted against a top surface of the positioning pillars 242 to fix the second circuit board 21. The pair of the location holes 213 are used to position the first probe-type connector 31 and the second probe-type connector 32. The stop blocks 241 are used to be abutted against the rechargeable battery 22 to fix the rechargeable battery 22. The notch 243 is used to be engaged with the power button 29. A front end of the power button 29 is exposed to an outside of the notch 243. The lamp base 244 is used to fix the indicator lamp 28. The second positioning pieces 245 are used to position a magnet 33. The openings 246 are used to connect to the first probe-type connector 31 of the previous second mobile power pack 20 to realize a connection of the first mobile power pack 10 and the second mobile power pack 20 or of the two second mobile power packs 20. The openings 261 are used to position the first probe-type connector 31. A part of the first probe-type connector 31 is exposed to an outside of the openings 261. The circular groove 262 is used to position the second anti-slip mat 27 to avoid slipping in use.

The positioning pieces 263 are used to be abutted against the second coil 23 to realize positioning and fixation between the second upper cover 26 and the second coil 23. The fixed part 301 is fixed in the cavities 212 to realize positioning and fixation between the switch 30 and the second circuit board 21. The switch 30 is arranged in the recess 291 while the convex block 302 is abutted against the power button 29.

Figure 7:
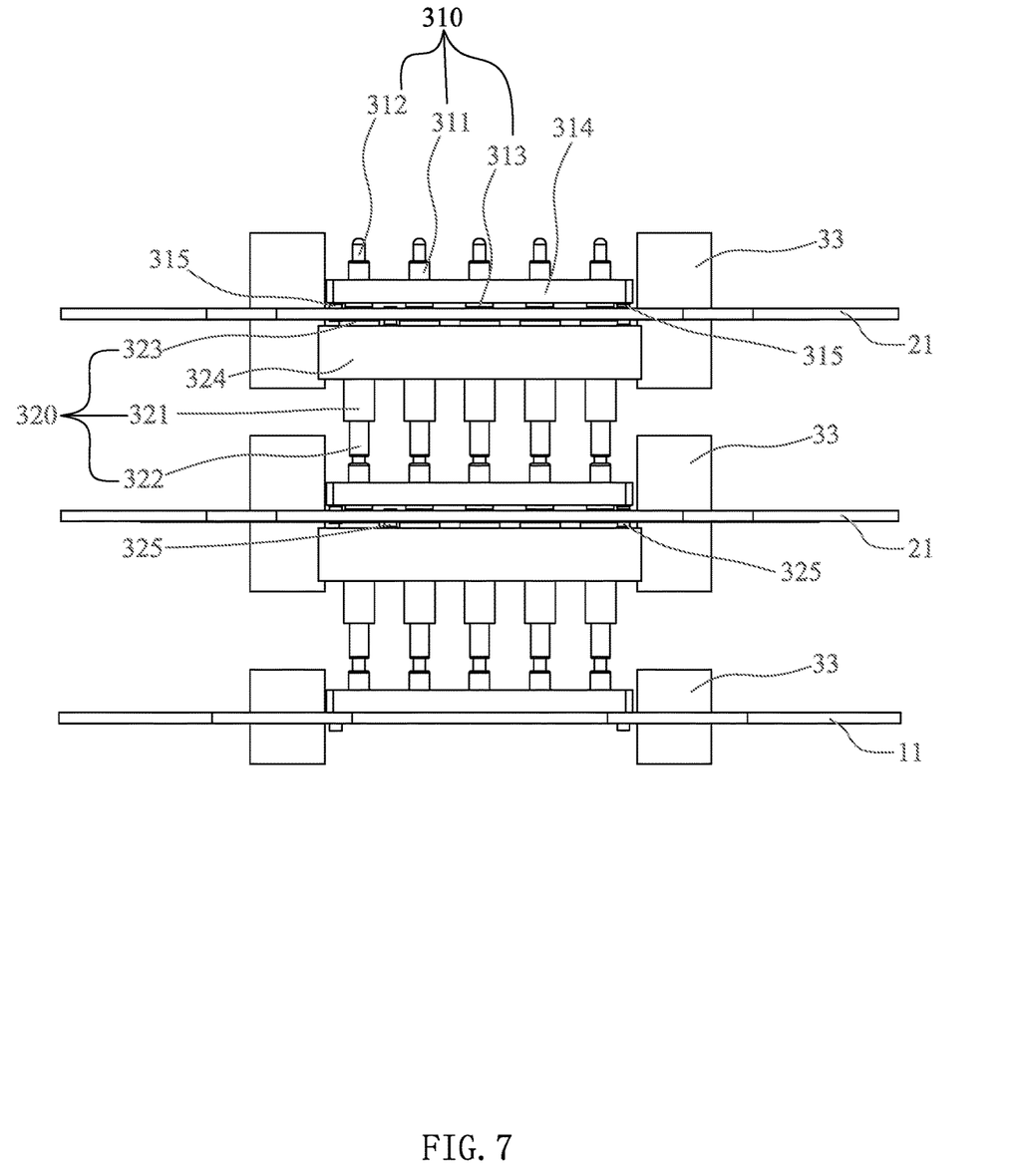
FIG. 7 is a schematic view showing a connection of a first probe-type connector and a second probe-type connector of the mobile power pack combination of the present invention.

With reference to FIG. 5 through FIG. 7, the first probe-type connector 31 is disposed with several single probes 310 and a base body 314. Each of the single probes 310 includes an outer tube 311, a probe pin 312 and a probe tube 313. A part of the outer tube 311 is encased in the base body 314. The outer tube 311 is extended upward to form the probe pin 312. The outer tube 311 is extended downward to form the probe tube 313 which is exposed out of the base body 314. The base body 314 is disposed with two position pins 315 that are arranged in tandem and alternatively. The two position pins 315 are used to position with the pair of the location holes 113 of the first circuit board 11 and the pair of the location holes 213 of the second circuit board 21 to realize positioning and fixation between the first probe-type connector 31 and the top surfaces of the first circuit board 11 and the second circuit board 21. In this embodiment, a front end of the probe pin 312 is in semicircle shape. The second probe-type connector 32 is disposed with several single probes 320 and a base body 324. Each of the single probes 320 includes an outer tube 321, a probe pin 322 and a probe tube 323. A part of the outer tube 321 is encased in the base body 324. The outer tube 321 is extended downward to form the probe pin 322. The outer tube 321 is extended upward to form the probe tube 323 which is exposed out of the base body 324. The base body 324 is disposed with two position pins 325 that are arranged in tandem and alternatively. The two position pins 325 are used to position with the pair of the location holes 113 of the first circuit board 11 and the pair of the location holes 213 of the second circuit board 21 to realize positioning and fixation between the first probe-type connector 31 and the bottom surfaces of the first circuit board 11 and the second circuit board 21. The probe pin 312 of the first probe-type connector 31 is connected to the probe pin 322 of the second probe-type connector 32 to make electric current conduct, which provides the charge function by an electric connection with the previous first mobile power pack 10 or another second mobile power pack 20. In this embodiment, a front end of the probe pin 322 has a concave surface. The position pins 315,325 are arranged in tandem and alternatively and the first circuit board 11 and the second circuit board 21 are connected between the position pins 315,325.

In this embodiment, each of left and right sides of the first probe-type connector 31 and the second probe-type connector 32 is provided with a magnet 33. The magnet 33 is used to absorb the first mobile power pack 10 and the second mobile power pack 20 or the two second mobile power packs 20 for a connection therebetween.

Figure 8:
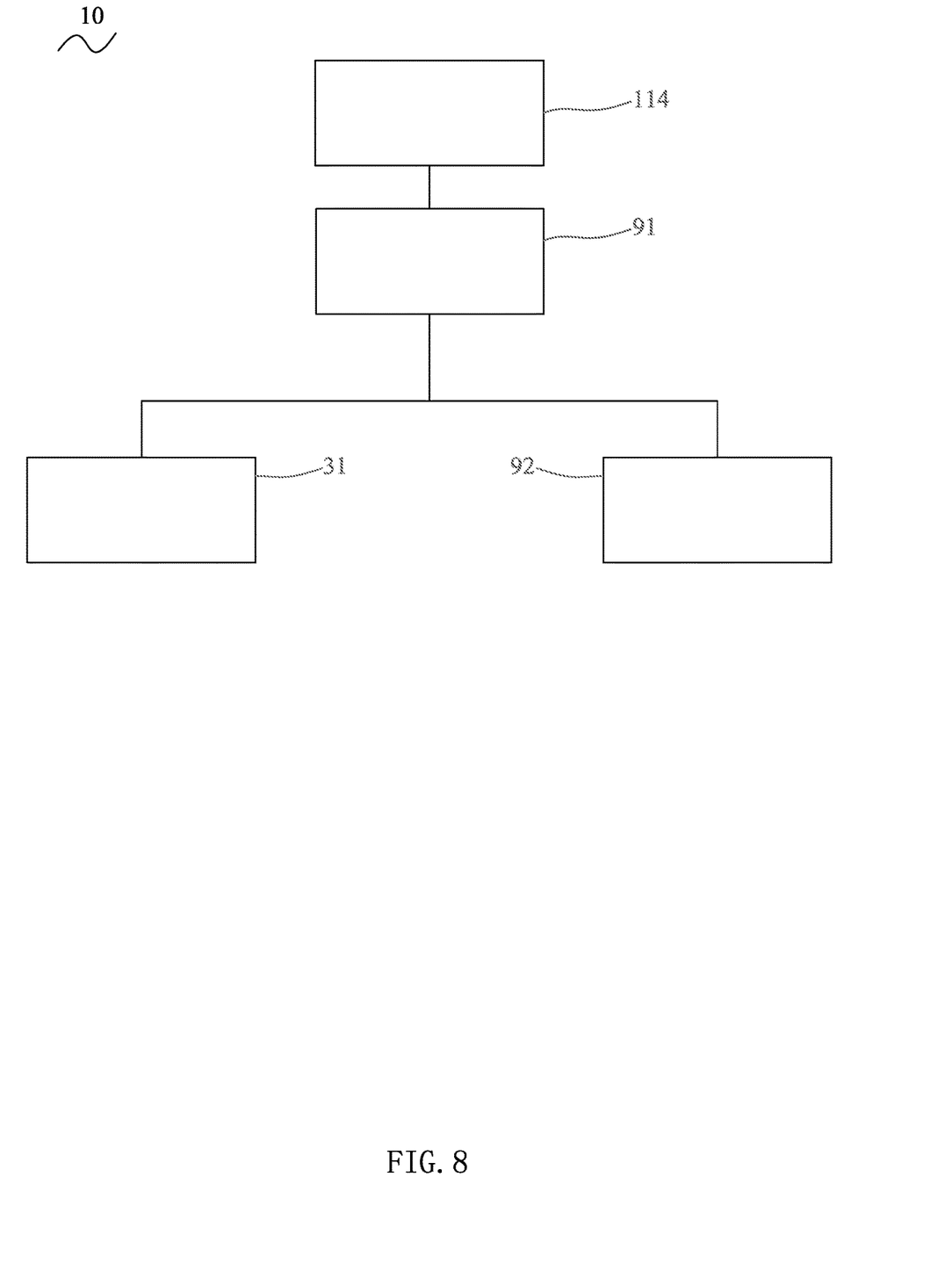
FIG. 8 is a block diagram showing a circuit of the first mobile power pack of the mobile power pack combination of the present invention.
Figure 10:
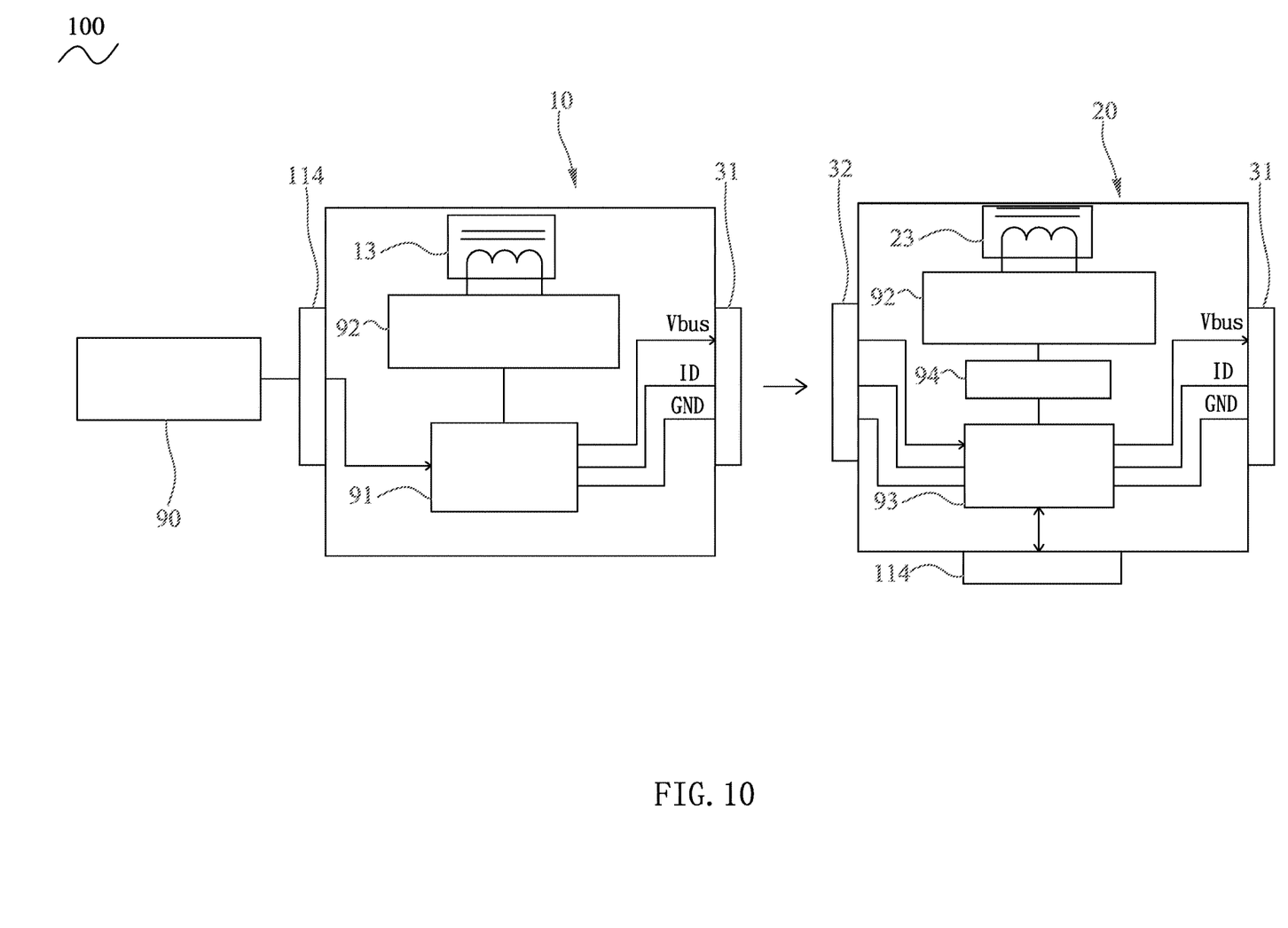
FIG. 10 is a circuit diagram showing a circuit stack of the mobile power pack combination of the present invention.
Figure 11:
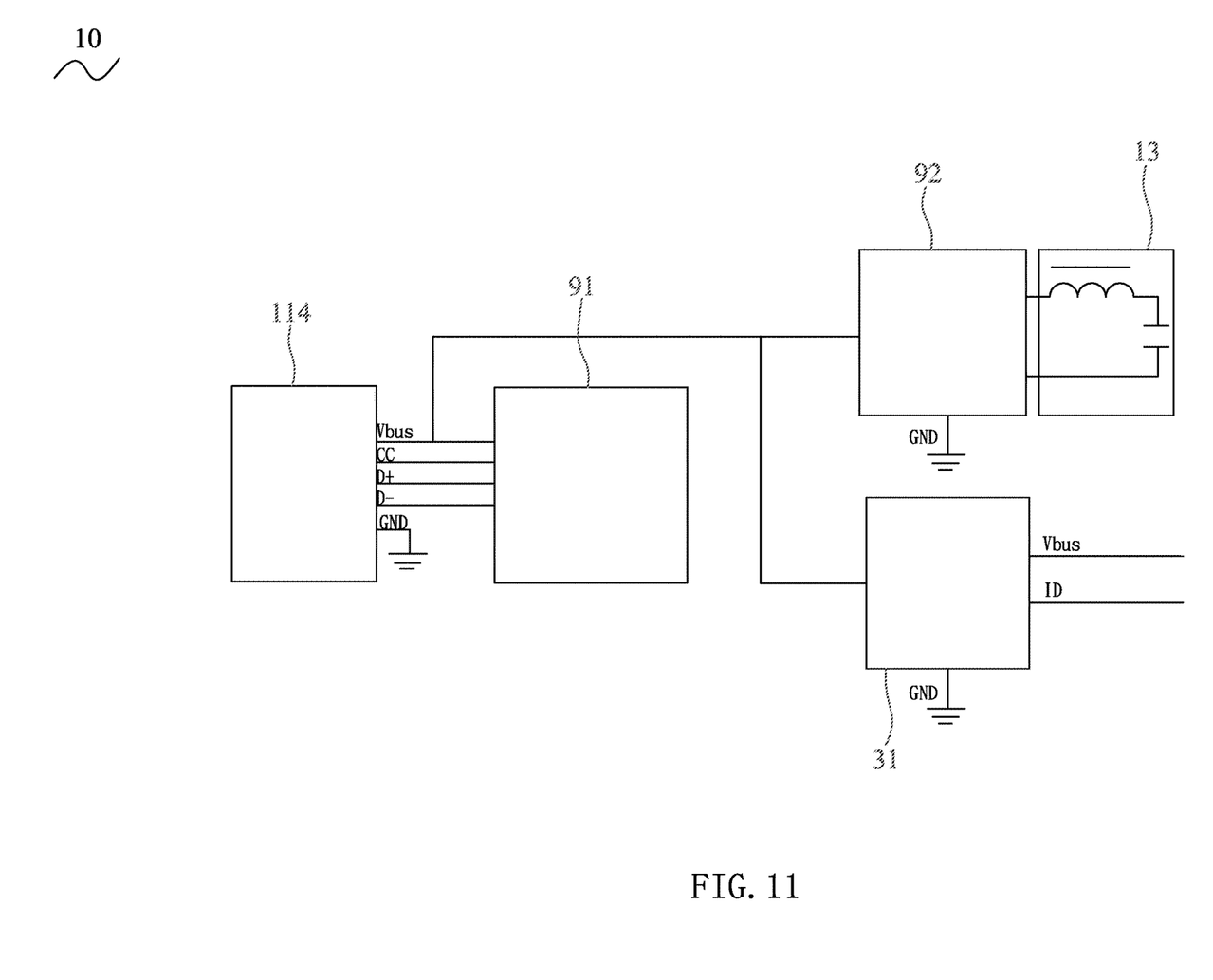
FIG. 11 is a circuit diagram showing the circuit of the first mobile power pack of the mobile power pack combination of the present invention.

With reference to FIG. 8, FIG. 10 and FIG. 11, the mobile power pack combination 100 of the present invention includes an AC/DC converter 90. The AC/DC converter 90 is connected to the socket connector 114 while the socket connector 114 is connected to a quick charge module 91. The quick charge module 91 has a fast charge function and is connected to a wireless charge module 92. The wireless charge module 92 is connected to the first coil 13. The quick charge module 91 transmits voltage to the first probe-type connector 31, while the first probe-type connector 31 is connected to the second probe-type connector 32.

Figure 9:
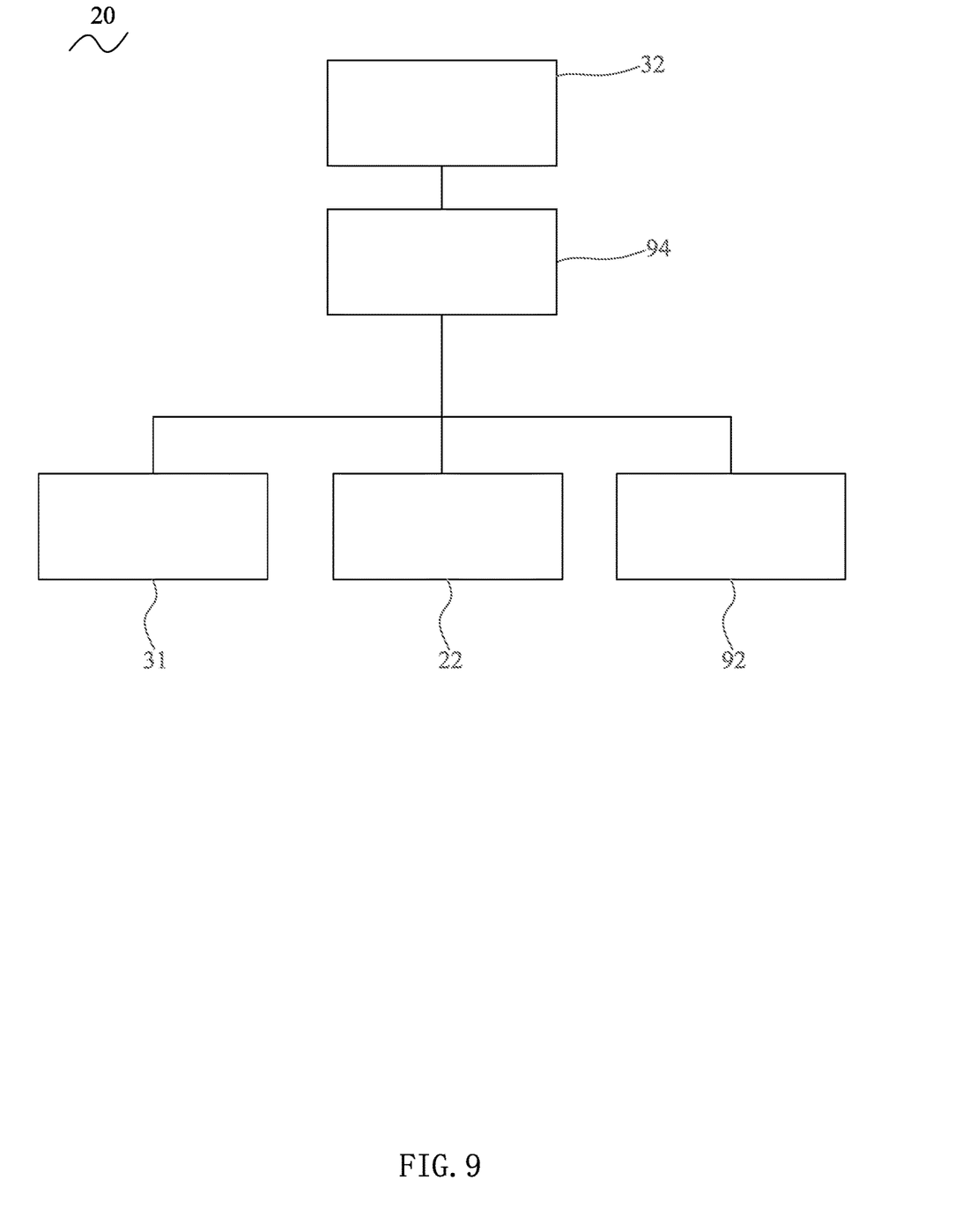
FIG. 9 is a block diagram showing a circuit of the second mobile power pack of the mobile power pack combination of the present invention.
Figure 12:
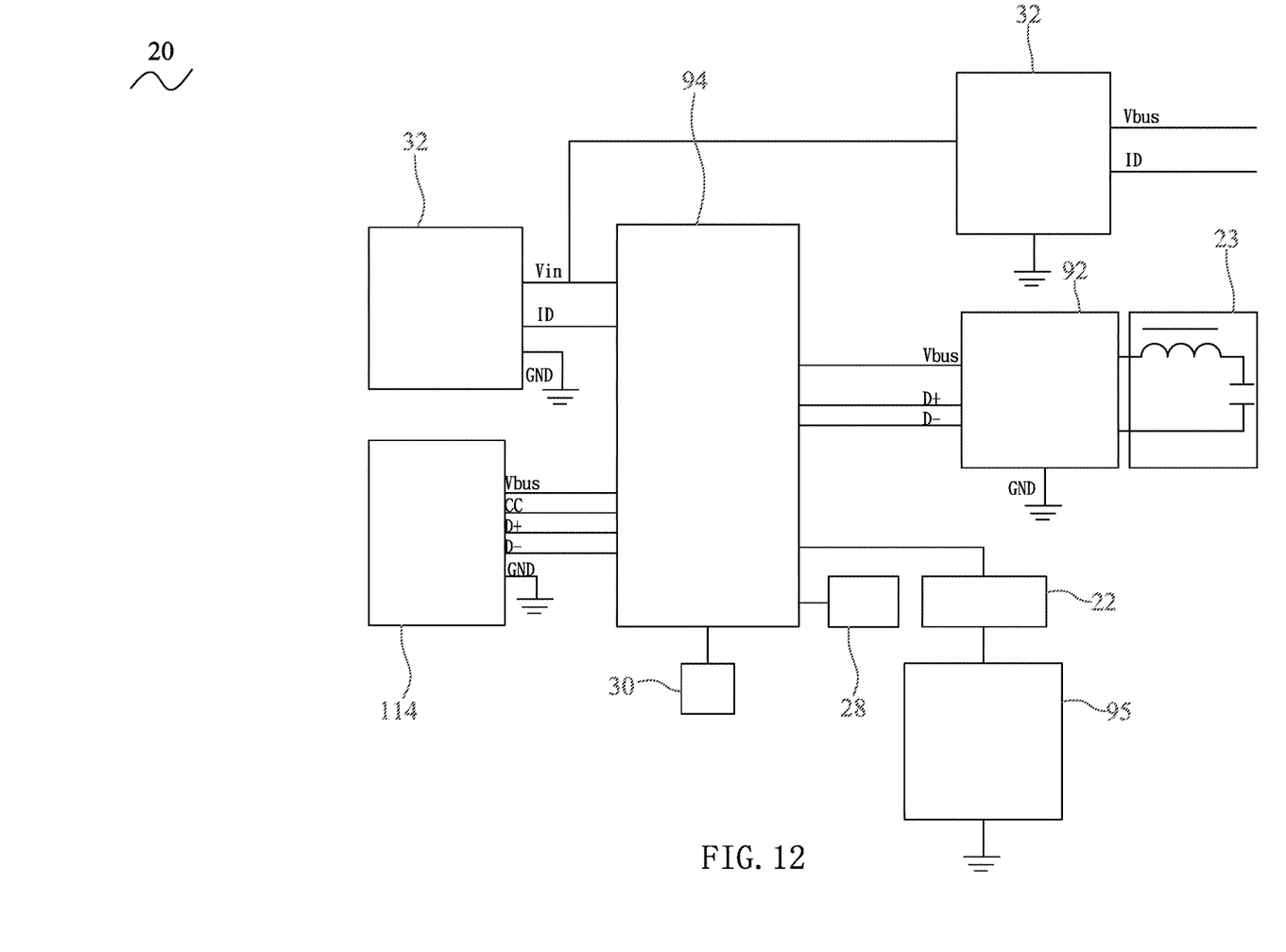
FIG. 12 is a circuit diagram showing the circuit of the second mobile power pack of the mobile power pack combination of the present invention.

With reference to FIG. 9, FIG. 10 and FIG. 12, the second probe-type connector 32 is connected to a quick charging transmission module 93. The quick charging transmission module 93 has fast charge and power supply functions and is respectively connected to the socket connector 114 and a battery management module 94. The battery management module 94 is connected to the wireless charge module 92, the indicator lamp 28, the switch 30 and the rechargeable battery 22. The rechargeable battery 22 is connected to a pulse-code modulation unit 95. The wireless charge module 92 is connected to the second coil 23. In this embodiment, the second mobile power pack 20 does not include the socket connector 114. In practice, the socket connector 114 may be installed for related functions.

As above, the mobile power pack combination 100 of the present invention provides an optimized structure, by which the probe pin 312 of the first probe-type connector 31 is connected to the probe pin 322 of the second probe-type connector 32 to make electric current conduct, and the first mobile power pack 10 and the second mobile power pack 20 can be used independently. Therefore, the mobile power pack combination 100 provides charging function based on stackable technology and is convenient to carry.

What is claimed is:

1. A mobile power pack combination, including:
    a first mobile power pack, having a first housing, the first housing disposed with a first charging unit and a first probe connector, the first probe connector connected to the first charging unit, the first charging unit consisting of a first circuit board and a first coil; and
    at least a second mobile power pack, connected to and stacked on the first mobile power pack, the second mobile power pack having a second housing, the second housing disposed with a second charging unit, a first probe connector and a second probe connector, the first probe connector and the second probe connector connected to the second charging unit, the second charging unit consisting of a second circuit board, a second coil and a rechargeable battery;
    wherein when the second mobile power pack is stacked on the first mobile power pack, the second probe connector of the second mobile power pack is connected with the first probe connector of the first mobile power pack to make electric current conduction;
    wherein each of the first probe connectors of the first and second mobile power packs and the second probe connector is disposed with a plurality of single probes and a base body, each of the plurality of single probes includes an outer tube, a probe pin and a probe tube, a part of the outer tube is encased in the base body, the outer tube is extended upward to form the probe pin, the outer tube is extended downward to form the probe tube which is exposed out of the base body.

2. The mobile power pack combination of claim 1, wherein a front end of the probe pin of the first probe connectors of the first and second mobile power packs is in semicircle shape.

3. The mobile power pack combination of claim 1, wherein a front end of the probe pin of the second probe connector has a concave surface.

4. The mobile power pack combination of claim 1, wherein the first housing consists of a first lower cover and a first upper cover, the second housing consists of a second lower cover and a second upper cover.

5. The mobile power pack combination of claim 1, wherein each of left and right sides of the first probe connectors of the first and second mobile power packs and the second probe connector is provided with a magnet.

\* \* \* \* \*